US006327649B1

(12) United States Patent
El-Kik

(10) Patent No.: US 6,327,649 B1
(45) Date of Patent: Dec. 4, 2001

(54) APPARATUS FOR DEVELOPING INTERNAL ROM CODE USING A ROM BUS EXTERNAL INTERFACE

(75) Inventor: Tony S. El-Kik, Allentown, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/236,049

(22) Filed: Jan. 22, 1999

(51) Int. Cl.[7] ................................................. G06F 9/445
(52) U.S. Cl. ................................................. 712/216
(58) Field of Search ........................ 717/4; 713/400; 711/167; 710/26, 13

(56) References Cited

U.S. PATENT DOCUMENTS

| | | | |
|---|---|---|---|
| 5,513,374 | * 4/1996 | Baji | 395/846 |
| 5,740,404 | * 4/1998 | Baji | 395/494 |
| 6,094,726 | * 7/2000 | Gonion et al. | 713/400 |
| 6,134,605 | * 10/2000 | Hudson et al. | 710/13 |

* cited by examiner

Primary Examiner—Mark R. Powell
Assistant Examiner—Michael B. Holmes
(74) Attorney, Agent, or Firm—Schnader Harrison Segal & Lewis LLP

(57) ABSTRACT

An apparatus for developing internal ROM code is disclosed for use in applications where software code is being developed for a ROM device inside a device and there is a need for the application to cause code from an external memory to be executed at the same time as internal ROM code. Accessing code from an external memory requires the use of the external bus interface. In order to free the external memory for use and the external bus interface for accessing code from external memory yet still allow testing of ROM code from an external memory before it is implemented on a ROM chip inside the device, an additional memory is used outside the device, and internal control logic is added.

6 Claims, 2 Drawing Sheets

APPARATUS FOR DEVELOPING INTERNAL ROM CODE USING A ROM BUS EXTERNAL INTERFACE

BACKGROUND OF THE INVENTION

1. Field of the Invention

This invention relates to applications where software code is being developed for a read only memory (ROM) device inside a system which will need to run the ROM code and code from an external memory simultaneously. An important example of this type of application is a digital signal processing device software development application.

2. Description of the Prior Art

Often, when developing ROM code for an application, a developer will want to test the code before implementing it on a chip inside of ROM, because that implementation can be expensive and time consuming. In the prior art, a solution has been to use the external bus interface to external memory for this purpose. The code to be tested is placed in the external memory. Once it is there, it can be accessed by the external bus interface, and therefore by the elements of the system that can access the external bus interface. The code, then, does not need to be resident in the ROM to be tested; placing the code in external memory provides all the access to the code that is needed for testing.

A problem occurs, however, when attempting the testing of applications which, when operational, will require access to the external memory. Trying to test them according to the methods disclosed in the prior art will clearly not work - the external memory must be left alone to be used by the application and at the same time would be needed for storing the code to be tested. The instant invention works to solve this problem without forcing the software developer to create a ROM chip for each version of the code that must be tested which is costly and time-consuming.

SUMMARY OF THE INVENTION

The present invention comprises, in one aspect, an apparatus for testing data to be stored in non-volatile memory. This apparatus is used in a data processing device comprising a processor, a non-volatile memory operably coupled to said processor, and an external bus interface operably coupled to said processor and said non-volatile memory, and where said data processing device is operably coupled to a first external memory. The apparatus for testing data to be stored within a non-volatile memory comprises a second external memory coupled to said external bus interface, and an interface block operably coupled to said non-volatile memory, to said processor, and to said second external memory, said interface block comprising means for causing data from second external memory to be provided to said processor upon the receipt by said interface block of memory requests from said processor.

BRIEF DESCRIPTION OF THE DRAWINGS

Other features and advantages of the present invention will be described in further detail with reference to the accompanying drawings, in which.

DETAILED DESCRIPTION

Figure 1:
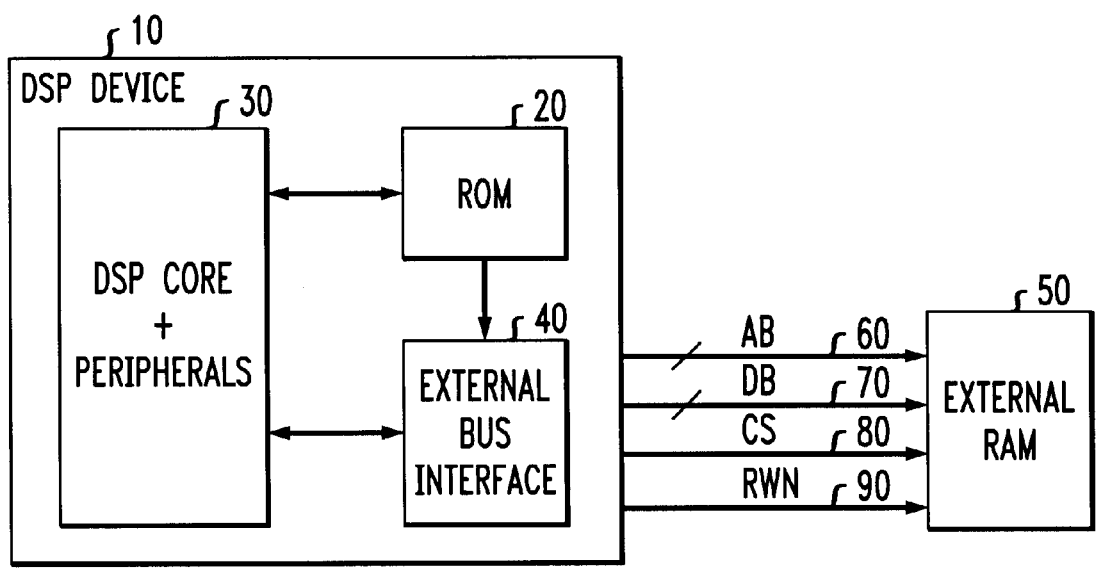
FIG. 1 is a diagram of the prior art system for testing ROM code in applications which do not require access to external memory.

Referring now to FIG. 1, which shows a prior art system for testing ROM code in applications which do not require access to external memory, the digital signal processor (DSP) device, 10, must include code which will be stored in ROM, 20, which is used to help run the DSP core and peripherals, 30. Also included in the DSP device, 10, is an external bus interface, 40, which provides an interface to external random access memory (RAM) 50 through a set of address lines, 60, a set of data lines, 70, a chip select line, 80, and a read/write line, 90. When the developer wishes to test ROM code in this prior art system, the code is written onto external RAM 50. The DSP device, 10, can then access it via the external bus interface, and it can be run as if it were located on ROM, 20. The problem is if the external RAM, 50, external bus interface, 40, and related lines (60, 70, 80, 90) are being used in the execution of the very code that must be tested. If this situation arises, the prior art technique for testing ROM code clearly can not work.

Figure 2:
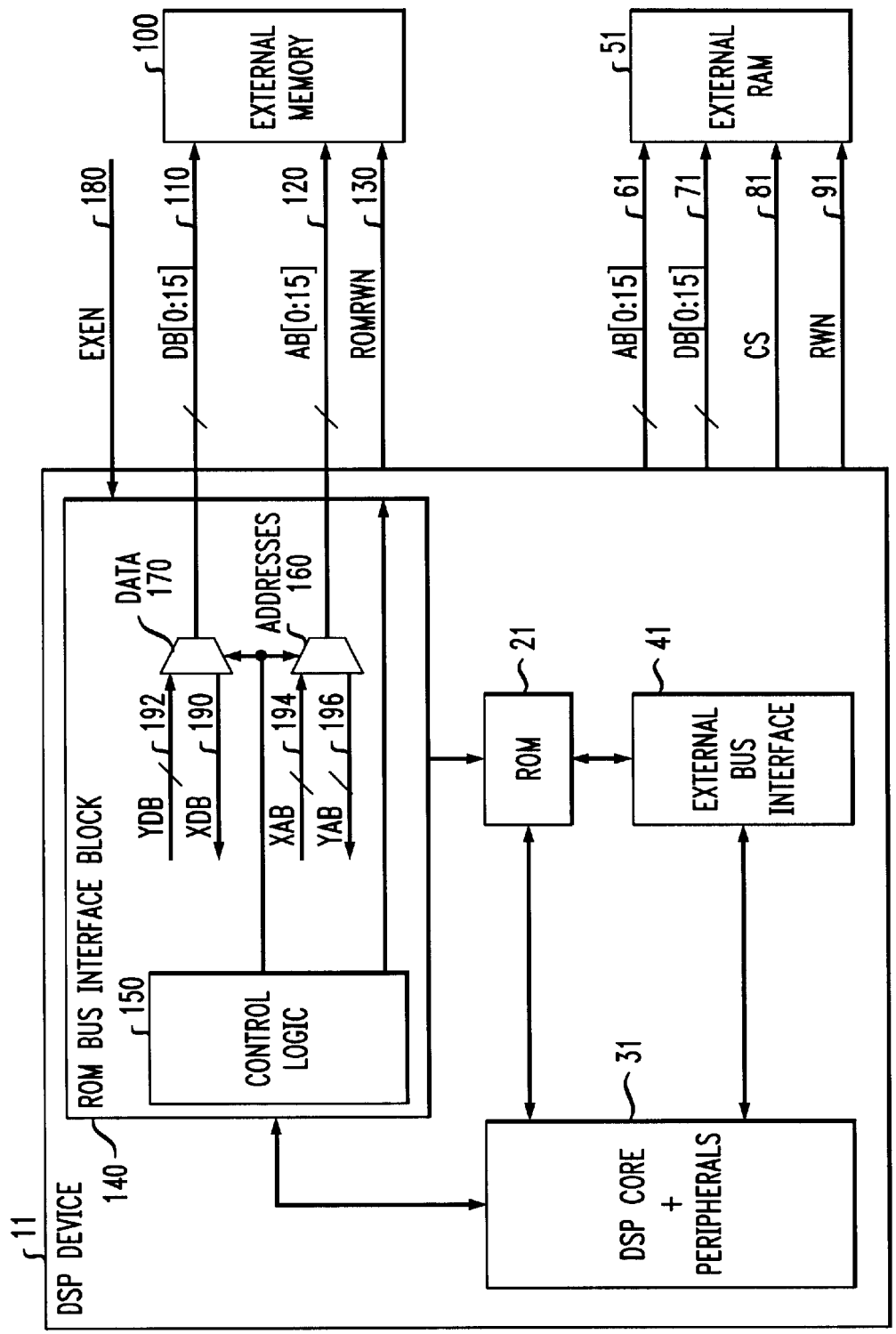
FIG. 2 is a diagram of a digital signal processing device according to the present invention.

Referring now to FIG. 2, which shows a preferred embodiment of the present invention. The DSP device, 11, still includes a ROM, 21, DSP core and peripherals, 31, and an external bus interface, 41. The external bus interface, 41, provides an interface to external RAM, 51, through the same signals, a set of address lines, 61, a set of data lines, 71, a chip select line, 81, and a read/write line, 91. The present invention, however, also provides a second external memory, 100, which is accessed by the DSP device, 11, through a second set of data lines, 10, a second set of address lines, 120, and a ROM read/write line, 130. Access to the second external memory, 100, is controlled by the ROM bus interface block, 140, which includes control logic, 150, an address multiplexer (mux), 160, and a data mux, 170. An interface block control signal, the external enable (EXEN) signal, is also provided to the ROM bus interface block, 140 via an EXEN pin, 180.

Instead of loading the code to be tested onto external RAM, 51, the code is loaded into external memory, 100. The control logic, 150, generates the ROM read/write line signal, as well as generating signals to the data mux, 170, and the address mux, 160. These muxes serve to let the control logic, 150, specify whether to send or receive data (the external data bus lines, 190 (XDB), carry the signal if data is to be read from external memory, 100, the external bus lines, 192 (YDB), carry the signal if data is to be written to external memory, 100) and which address of the external memory, 100, the data should be retrieved from or written to (the external read address bus lines (XAB) 194 are used to retrieve data and the external write address bus lines (YAB) 196 are used to write data). The data mux, 170, is connected to the external memory, 100, through the second data lines, 110, and the address mux, 160, is connected to the external memory, 100, through the second address lines, 120. The signal provided via the EXEN pin, 180, provides the toggle between using the code resident in ROM, 21, and using code in the external memory, 100. Because using code in external memory, 100, and using the ROM bus interface block, 140, can occur simultaneously with any use of the external bus interface, 41, or external RAM, 51, the system is capable of testing code for the ROM even if that code necessitates the use of external RAM, 51.

What has been described are only some examples of methods and systems according to the invention. Accordingly, it is to be understood that various and numerous other arrangements may be devised by one skilled in the art without departing from the spirit and scope of the invention as limited only by the accompanying claims.

I claim:

1. A code testing apparatus for a data processing device having a first external memory for storing data, the processing device comprising a processor, a non-volatile memory operably coupled to the processor, and an external bus interface operably coupled to the processor, the non-volatile memory and the first external memory, wherein the code testing apparatus comprises:

a second external memory for storing code to be tested; and an interface block operably coupled to the non-volatile memory, the processor, and the second external memory, wherein the interface block provides the functionality for the data processing device to execute the code stored in the second external memory using data stored in the first external memory if such data is needed to test the code.

2. The testing apparatus of claim 1 further comprising an external enable pin to provide a signal to the interface block to select between executing code stored in the second external memory or code stored in the non-volatile memory.

3. The testing apparatus of claim 7, wherein the interface block comprises:

an address multiplexer to multiplex read and write address buses;

a data multiplexer to multiplex read and write data buses; and a control logic block operably coupled to the data and address multiplexers;

wherein the control logic block selects the write address and data buses to interface with the second external memory when code to be tested is loaded into the second external memory; and the control logic block selects the read address and read data buses to interface with the second external memory when code to be tested is executed from the second external memory.

4. The testing apparatus of claim 1 used to test code in a digital signal processor.

5. The testing apparatus of claim 1 wherein the interface block is incorporated into the data processing device.

6. A digital signal processing device comprising a code testing apparatus according to claim 1.

* * * * *